US010046378B2

(12) United States Patent
Kato et al.

(10) Patent No.: US 10,046,378 B2
(45) Date of Patent: Aug. 14, 2018

(54) BENDING ROBOT AND METHOD FOR DETECTING WORKPIECE

(71) Applicant: AMADA HOLDINGS CO., LTD., Kanagawa (JP)

(72) Inventors: Tetsuaki Kato, Kanagawa (JP); Atsushi Yamagishi, Kanagawa (JP); Daiya Uchida, Kanagawa (JP)

(73) Assignee: AMADA HOLDING CO., LTD., Kanagawa (JP)

( * ) Notice: Subject to any disclaimer, the term of this patent is extended or adjusted under 35 U.S.C. 154(b) by 0 days.

(21) Appl. No.: 15/548,559

(22) PCT Filed: Jan. 28, 2016

(86) PCT No.: PCT/JP2016/052434
§ 371 (c)(1),
(2) Date: Aug. 3, 2017

(87) PCT Pub. No.: WO2016/132845
PCT Pub. Date: Aug. 25, 2016

(65) Prior Publication Data
US 2018/0015619 A1    Jan. 18, 2018

(30) Foreign Application Priority Data

Feb. 19, 2015    (JP) .................................. 2015-030214

(51) Int. Cl.
*B21D 43/24*        (2006.01)
*B21D 43/20*        (2006.01)
(Continued)

(52) U.S. Cl.
CPC .............. *B21D 43/24* (2013.01); *B21D 5/02* (2013.01); *B21D 43/105* (2013.01); *B21D 43/20* (2013.01);
(Continued)

(58) Field of Classification Search
CPC ....... B21D 43/24; B21D 43/20; B21D 43/105
See application file for complete search history.

(56) References Cited

U.S. PATENT DOCUMENTS 5,988,855 A  * 11/1999  Marobin ................ B25J 9/1666
                                                                700/145
2004/0237284 A1* 12/2004  Nakamura ....... G05B 19/41865
                                                                 29/564
(Continued)

FOREIGN PATENT DOCUMENTS

CN         103501961        1/2014
JP         05-212475        8/1993
(Continued)

OTHER PUBLICATIONS

Search Report and Written Opinion issued in International WIPO Patent Application No. PCT/JP2016/052434, dated Mar. 22, 2016.
(Continued)

*Primary Examiner* — Thomas Randazzo
(74) *Attorney, Agent, or Firm* — Greenblum & Bernstein, P.L.C.

(57) ABSTRACT

A bending robot takes out a workpiece stored on a stacker while contacting its end face with a storage reference flat plane of the stacker, and then supplies it to a bending machine. The bending robot includes a main body movable parallel to the storage reference flat plane, an arm portion supported by the main body and capable of positioning above the stacker, and a distance sensor provided in the arm portion for measuring a distance to the workpiece stored on the stacker in a contactless manner. According to the bending robot, bending can be done with high efficiency.

3 Claims, 8 Drawing Sheets

US 10,046,378 B2
Page 2

(51) Int. Cl.
  *B21D 43/10* (2006.01)
  *B25J 13/08* (2006.01)
  *B21D 5/02* (2006.01)

(52) U.S. Cl.
  CPC .......... *B25J 13/086* (2013.01); *B25J 13/087* (2013.01); *B25J 13/088* (2013.01)

(56) References Cited

U.S. PATENT DOCUMENTS

| | | | | |
|---|---|---|---|---|
| 2008/0184761 A1* | 8/2008 | Hammerer | ............... | B21D 7/12 72/306 |
| 2008/0226438 A1* | 9/2008 | Fischereder | ......... | B21D 5/0281 414/795.7 |
| 2013/0213769 A1* | 8/2013 | Plakolm | ................ | B23Q 7/005 198/463.3 |

FOREIGN PATENT DOCUMENTS

| | | | | |
|---|---|---|---|---|
| JP | 08-252640 | 10/1996 | | |
| JP | 2002-137019 | 5/2002 | | |
| JP | 2002-153929 | 5/2002 | | |
| JP | 2002153929 A | * 5/2002 | ............ | B21D 43/00 |
| JP | 2012-024903 | 2/2012 | | |
| JP | 2014-046369 | 3/2014 | | |
| JP | 2014046369 A | * 3/2014 | ............. | B25J 15/08 |
| WO | 2014/050829 | 4/2014 | | |

OTHER PUBLICATIONS

Notification of Reasons for Refusal in JP 2015-030214 with English language translation dated Mar. 10, 2016.
Decision to Grant in JP 2015-030214 with English language translation, dated Sep. 2, 2016.

* cited by examiner

BENDING ROBOT AND METHOD FOR DETECTING WORKPIECE

TECHNICAL FIELD

The present invention relates to a bending robot that takes out a plate-shaped workpiece placed on a stacker (workpiece stacking apparatus) and then supplies it to a bending machine, and relates to a method for detecting existence or non-existence of a workpiece on a stacker.

BACKGROUND ART

A Patent Document 1 listed below discloses a multi-joint robot arm so-called as a bending robot that takes out a plate-shaped workpiece placed on a stacker by suctioning or the like and then supplies it to a bending process at a bending machine. In addition, a Patent Document 2 listed below discloses a technology in which workpiece detection carried out when taking out one workpiece from stacked workpieces by a multi-joint robot arm is made based on an image(s) taken by a camera disposed above. In addition, a Patent Document 3 listed below discloses a technology in which, in order to suction an uppermost one of stacked plate-shaped workpieces and then convey it, detection of an uppermost position of the stacked workpieces is carried out by a non-contact type distance sensor, using a laser or the like, that is attached to a hanging bracket disposed above the workpieces.

PRIOR ART DOCUMENT

Patent Document

Patent Document 1: Japanese Patent Application Publication No. 2002-137019
Patent Document 2: Japanese Patent Application Publication No. 2012-024903
Patent Document 3: Japanese Patent Application Publication No. H5-212475

SUMMARY OF INVENTION

It becomes possible to detect existence or non-existence of a workpiece(s) on a stacker by combining the detection technology based on an image(s) disclosed in the Patent Document 2 or the detection technology based on a result of measuring a distance by a non-contact type distance sensor disclosed in the Patent Document 3 with the bending robot discloses in the Patent Document 1. The detection of existence or non-existence of a workpiece(s) on a stacker is needed to be done first for bending, and is desired to be carried out at speed as high as possible in order to improve efficiency of bending by use of a bending robot.

However, in a case of taking an image(s) or measuring a distance from above a stacker in order to detect existence or non-existence of a workpiece(s), it is needed to carry out operations that have no direct relation to bending, i.e. to evacuate a bending robot from an image-taking area or a distance-measuring area in order not to interfere with the area, and then resume it after image-taking or distance-measuring is finished. Therefore, there is a problem to be improved, i.e. efficiency degradation of bending.

An object of the present invention is to provide a bending robot and a method for detecting a workpiece that can carry out bending with high efficiency.

A first aspect of the present invention provides a bending robot that takes out, or removes, a workpiece that is stored on a stacker having a storage reference flat plane and whose end face is being contacted with the storage reference flat plane, and then supplies the workpiece to a bending machine, comprising: a main body that is movable parallel to the storage reference flat plane; an arm portion that is supported by the main body and capable of positioning above the stacker; and a distance sensor that is provided in the arm portion and capable of measuring a distance to the workpiece stored on the stacker in a contactless manner.

Here, it is preferable that the main body moves parallel to the storage reference flat plane and the distance sensor measures on a measurement path in a vicinity of the storage reference flat plane.

A second aspect of the present invention provides a method for detecting whether or not a workpiece is stored on a stacker that stores the workpiece to be supplied to a bending machine by a bending robot, the method comprising: providing, in the stacker, a wall plate that has a storage reference flat plane contacting with an end face of the workpiece stored; preliminarily providing, in the bending robot, a main body that is movable parallel to the storage reference flat plane, an arm portion that is supported by the main body and capable of positioning above the stacker, and a distance sensor that is provided in the arm portion and capable of measuring a distance to the workpiece stored on the stacker in a contactless manner; a distance-measurement step for moving the main body parallel to the storage reference flat plane and measuring a distance along a measurement path in a vicinity of the storage reference flat plane by the distance sensor; and a judgement step for judging that the workpiece is stored on the stacker when two electric current values are measured in the distance-measurement of the distance-measurement step.

The bending robot in combination with the aforementioned stacker can be characterized as a workpiece supply apparatus.

DESCRIPTION OF EMBODIMENTS

Figure 1:
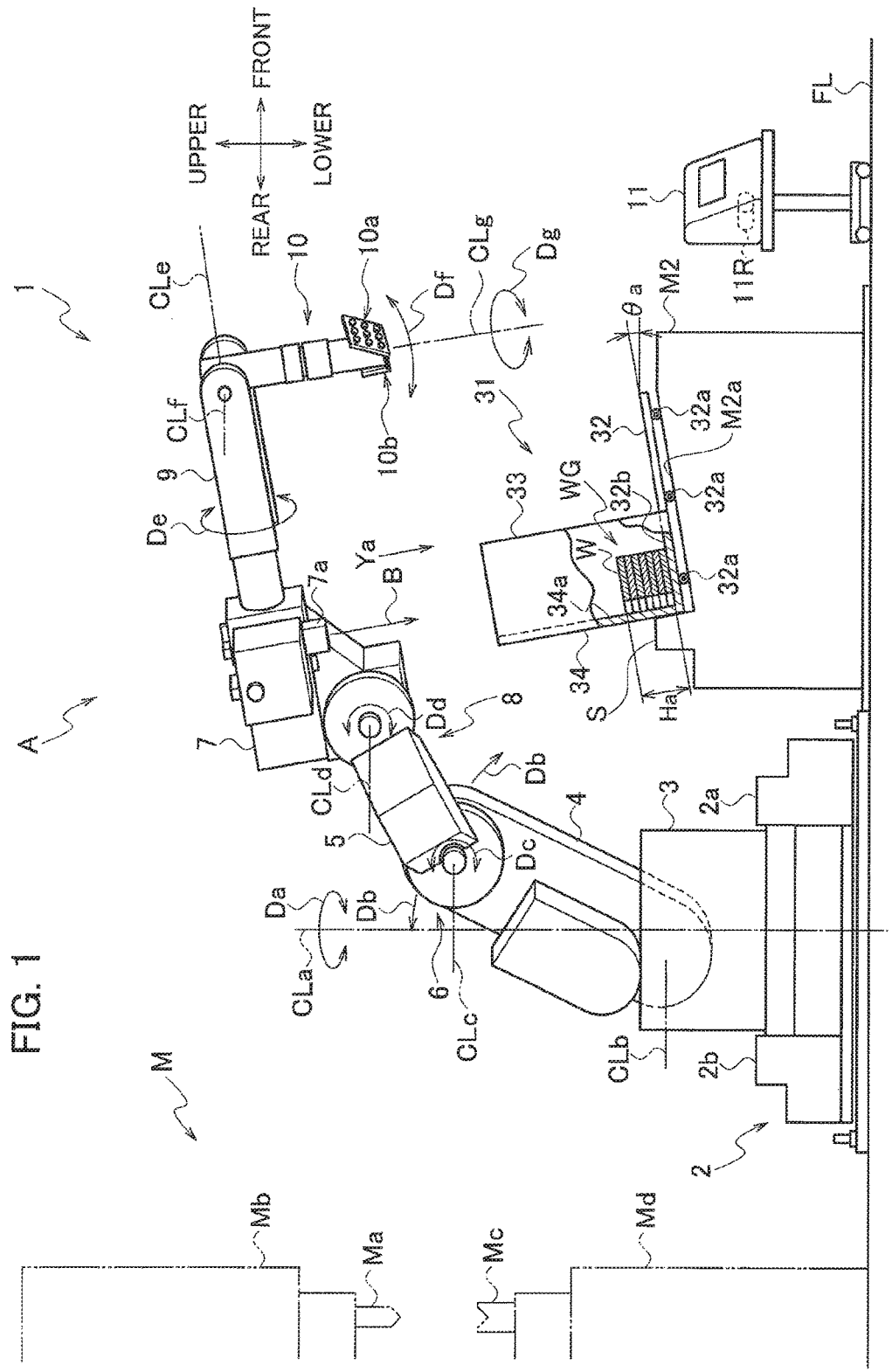
FIG. 1 It is a side view of a bending robot according to an embodiment.

A bending robot 1 according to an embodiment will be described with reference to the drawings. The bending robot 1 is configured to include a so-called 6-axis vertical multi joint robot arm. An overall configuration of the bending robot 1 will be explained with reference to FIG. 1. For convenience of the explanations, upper, lower, front and rear directions are recited as shown by arrows in FIG. 1. In addition, directions vertical to the drawings are recited as left and right directions, and its frontward direction is the left direction. In addition to the bending robot 1, devices and so on that are mounted around it are shown in FIG. 1.

The bending robot 1 is mounted in-front-of and near a bending machine M. The bending machine M extends in the left-to-right direction. The bending machine M includes a pair of bending dies, and also includes an upper table to which one die Ma thereof is installed and a lower table Md that is disposed oppositely-to and below the upper table Mb and to which another die Mc thereof is installed. The bending machine M makes one of the tables close to the other of the tables, and thereby carries out bending by nipping a workpiece W inserted between the upper table Mb and the lower table Md by a pair of the dies Ma and Mc.

A stacker placing base M2 is mounted in front of the bending robot 1. A stacker 31 is placed on the stacker placing base M2. Workpieces W to be bent by the bending machine N can be stacked on the stacker 31. The stacker 31 can be loaded onto the stacker placing base M2, and can be unloaded from the stacker placing base M2.

The bending robot 1 includes a base 2 and a main body 3. The base 2 has a pair of guide rails 2a and 2b that are mounted on a floor FL and extend in the left-to-right direction parallel to each other. The main body 3 is supported by the guide rails 2a and 2b so as to be movable in the left-to-right direction.

A base arm 4 is attached to the main body 3. The base arm 4 is rotatable about a vertical axis line CLa (see an arrow Da), and rotatable about a horizontal axis line CLb (see an arrow Db). An end of the base arm 4 is coupled with one end of an intermediate arm 5 by a joint 6. At the joint 6, the base arm 4 and the intermediate arm 5 are coupled with each other so as to be rotatable relatively to one another about a horizontal axis line CLc (see an arrow Dc).

Another end of the intermediate arm 5 is coupled with the shoulder 7 by a joint 8. At the joint 8, the intermediate arm 5 and the shoulder 7 are coupled with each other so as to be rotatable relatively to one another about a horizontal axis line CLd (see an arrow Dd). The axis line CLb, the axis line CLc and the axis line CLd are parallel to each other.

The shoulder 7 supports one end of a straight arm 9 extending straight along an axis line CLe that is perpendicular to the axis line CLd. Another end of the straight arm 9 supports an end arm 10. The end arm 10 is rotatable about an axis line CLf that intersects perpendicularly with the axis line CLe (see an arrow Df). The end arm 10 includes a suctioning portion 10a that suctions a workpiece W to hold it. The suctioning portion 10a is part of a clamper 10b. The clamper 10b clamps a workpiece W in a thickness direction thereof by its opening and closing operations. The suctioning portion 10a and the clamper 10b are rotatable about an axis line CLg extending in a longitudinal direction of the end arm 10 (see an arrow Dg).

In following explanations, the base arm 4, the intermediate arm 5, the shoulder 7, the straight arm 9 and the end arm 10 are called as an arm portion A as a whole. The arm portion A can take various postures by an after-explained drive portion KD, and can be positioned above the stacker 31. In this positioning, the stacker 31 is included at least in a movable area of the shoulder 7 when being viewed from above.

The bending robot 1 takes out a plate-shaped workpiece W stacked on the stacker 31, and then supplies it to the bending machine M mounted on an opposite side. Specifically, the bending robot 1 takes out an uppermost workpiece W from a workpiece group WG composed of plural workpieces W stacked on the stacker 31 by the suctioning portion 10a, and supplies the suctioned workpiece W to the bending machine M. The bending robot 1 changes holding positions of the workpiece W by the clamper 10b during a bending process to keep holding of the workpiece W by the posture of the arm portion A so as to follow a shape change of the workpiece W caused by bending. The bending robot 1 ejects (moves) the workpiece W to a predetermined ejection location after the bending.

Figure 2:
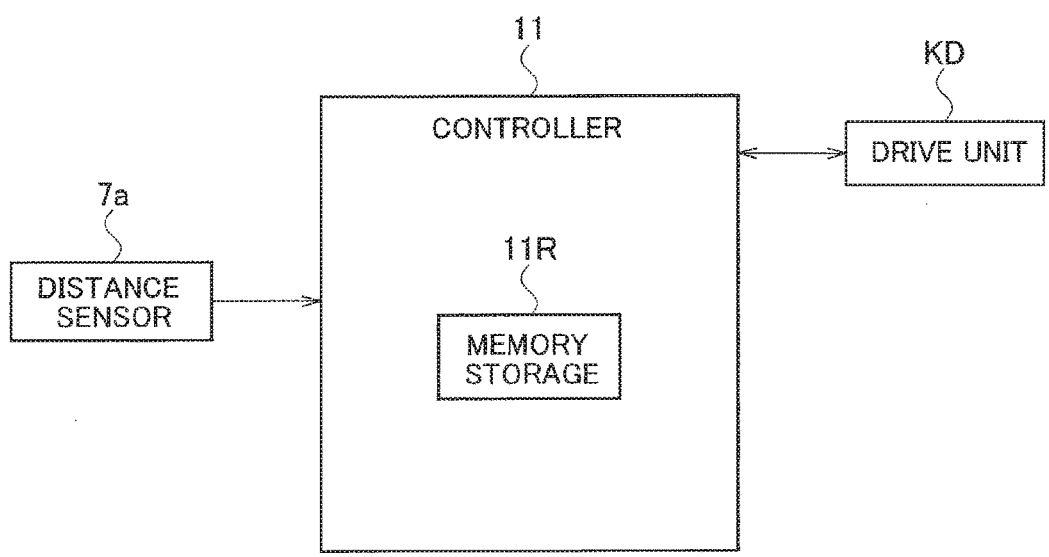
FIG. 2 it is a block diagram of the bending robot.

Movement operations of the main body 3 on the guide rails 2a and 2b and operations such as rotations of the respective arms of the arm portion A are carried out by respective drive portions (not shown in the drawings) integrated within the bending robot 1 under controlling by a controller 11. Here, the respective drive portions controlled by the controller 11 are called as a drive portion KD (see FIG. 2) as a whole. The drive portion KD includes detectors such as encoders and sensors that detect operating conditions of the respective drive portions. The operating conditions detected by the detectors are fed back to the controller 11. In FIG. 1, the controller 11 is mounted on the floor FL separately from the bending robot 1, and communicates with the bending robot 1 through wires.

The arm portion A is provided with a distance sensor 7a that can measure a distance to a distance-measured object located below in a contactless manner. The distance sensor 7a in the present embodiment is attached to the shoulder 7, and measures a distance by utilizing an optical beam B such as an infrared light or laser light. An installed position and an installed posture of the distance sensor 7a are set so that an optical beam B can be irradiated downward when an optic axis of the optical beam B irradiated for measuring a distance is made perpendicular to the axis line CLd and the axis line CLe and also the axis line CLe is made horizontal.

Figure 3:
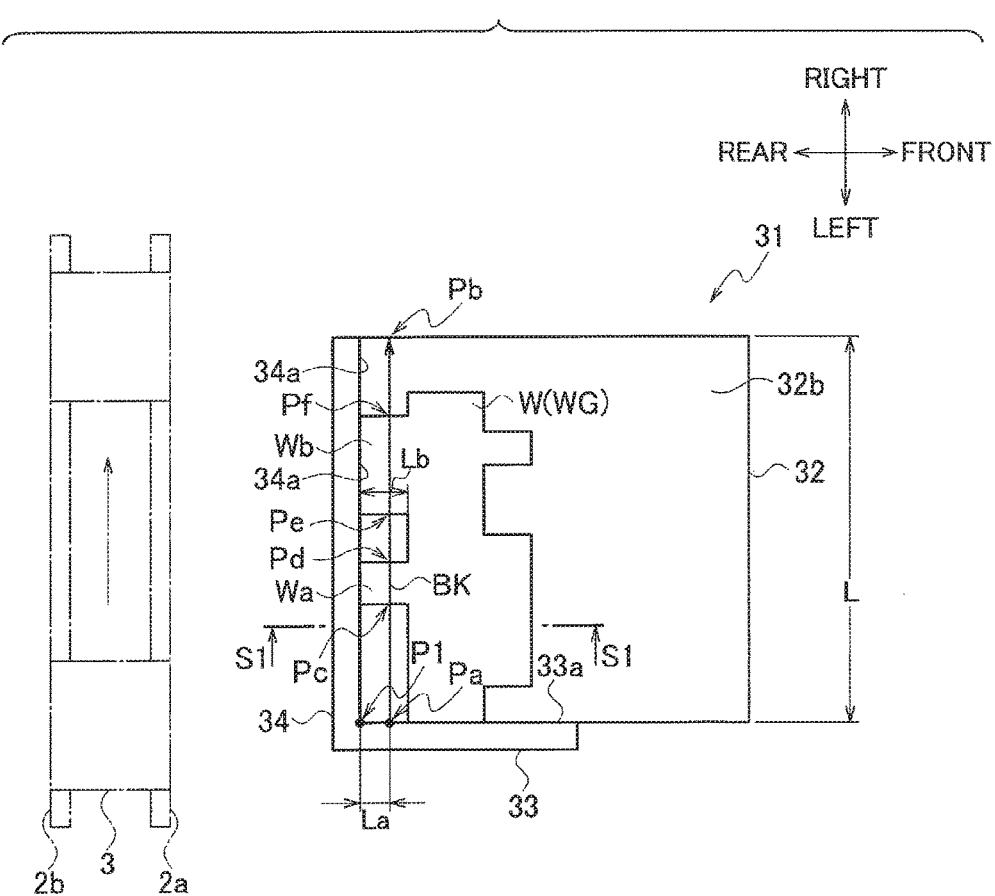
FIG. 3 It is a plan view of a stacker on which workpieces to be held by the bending robot are placed.

The stacker 31 is formed as a cart on which workpieces W can be stacked. A stacker placing portion M2a is provided at an upper portion of the stacker placing base M2. The stacker 31 is placed on the stacker placing portion M2a while being inclined with an angle θa to the horizontality so as to its side near the bending robot 1 is positioned lower. The stacker placing portion M2a has a stopper S that protrudes upward and determines a rear-side position of the stacker 31 by contacting with the stacker 31. FIG. 3 is a plan view of the stacker 31 viewed from a direction along an arrow Ya in FIG. 1, and a workpiece(s) W having a certain shape is stacked on the stacker 31.

The stacker 31 includes a rectangular-shaped bottom plate 32, a left wall plate 33 and a rear wall plate 34. The bottom plate 32 has plural casters 32a (see FIG. 1). The left wall plate 33 and the rear wall plate 34 are raised from two sides of the bottom plate 32 that are adjacent to each other. An upper face 32b of the bottom plate 32, a right face 33a of the left wall plate 33 and a front face (storage reference flat plane) 34a of the rear wall plate 34 are formed as faces that intersect perpendicularly with each other. The front face 34a is set so as to be parallel to the guide rails 2a and 2b when the stacker 31 positioned at the predetermined position where it is restricted by the stopper S. Namely, the main body 3 moves parallel to the front face 34a. The stacker 31 is placed obliquely on the stacker placing portion M2a so that its side near the rear wall plate 34 is positioned lower. Workpieces W are placed on the stacker 31 while serving an intersection point of the upper face 32a of the bottom plate 32, the right face 33a of the left wall plate 33 and the front face 34a of the rear wall plate 34 as a placement reference point P1.

Although an outline shape of a workpiece W may vary, a workpiece(s) W is placed on the stacker 31 while being made closer to the reference point P1 in the present embodiment. Therefore, a workpiece(s) is placed on the stacker 31 so that its at least one portion contacts with the right face 33a of the left wall plate 33 and its at least another portion contacts with the front face 34a of the rear wall plate 34. Namely, the right face 33a serves as a reference plane in the left-to-right direction and the front face 34a serves as a reference plane in the front-to-rear direction. In addition, it is preferable that, in the vicinity of the front face 34a, a length of a workpiece(s) W along the left-to-right direction is shorter than a width L (see FIG. 3) of the bottom plate 32. Namely, it is preferable that the upper face 32a is exposed in the vicinity of the front face 34a. According to this, the upper face 32a of the bottom plate 32 is exposed as a distance measurement reference plane on an irradiation path BK of the after-explained optical beam B.

Note that the upper face 32a may not be necessarily exposed in a state where a workpiece W is placed thereon. In a case where the upper face 32a is not exposed, a given electric current value is preliminarily set (adjusted) as a reference electric current value that corresponds to a reference position in a height direction during a calibration of the distance sensor 7a in a test operation or the like. According to this, a height of stacked workpieces W can be measured based on a difference between the set reference electric current value and a measured electric current value or a difference between an absolute value of the set reference electric current value and an absolute value of a measured electric current value. Of course, in a case where a measurement output of the distance sensor 7a is dependent on an electric voltage, the height can be measured based not on an output electric current but on an output electric voltage.

The mount position and the inclined angle θ of the stacker placing base M2 with respect to the mount position of the bending robot 1 are preliminarily determined. In addition, the placing position of the stacker 31 on the stacker placing base M2 is also preliminarily determined. Therefore, a position and a direction of the reference point P1 with respect to the bending robot 1 and a placement angle and an inclination direction of a workpiece(s) W placed on the stacker 31 can be preliminarily set, for example, on a three-dimensional coordinate (upper, lower, front, rear, left and right) recited in FIG. 1. These preliminarily set values are stored in a memory storage 11R of the controller 11.

The movable area of the arm portion A and the position of the stacker 31 on the stacker placing base M2 are set so that a distance to a rear portion (the rear wall plate 34 and its vicinity) of the stacker 31 can be measured.

The bending robot 1 having the above-explained configuration detects whether or not a workpiece(s) W is placed on the stacker 31 by the controller 11 when taking out a workpiece(s) W from the stacker 31, and detects a stack height Ha (if a workpiece(s) W is placed) (hereinafter, this is called as a workpiece detection operation). The stack height Ha corresponds to (a thickness Wt of a workpiece W)×(the number N of stacked workpieces W).

In the workpiece detection operation according to the present embodiment, a measurement operation and a judgement operation are carried out.

<Measurement Operation>

Figure 4:
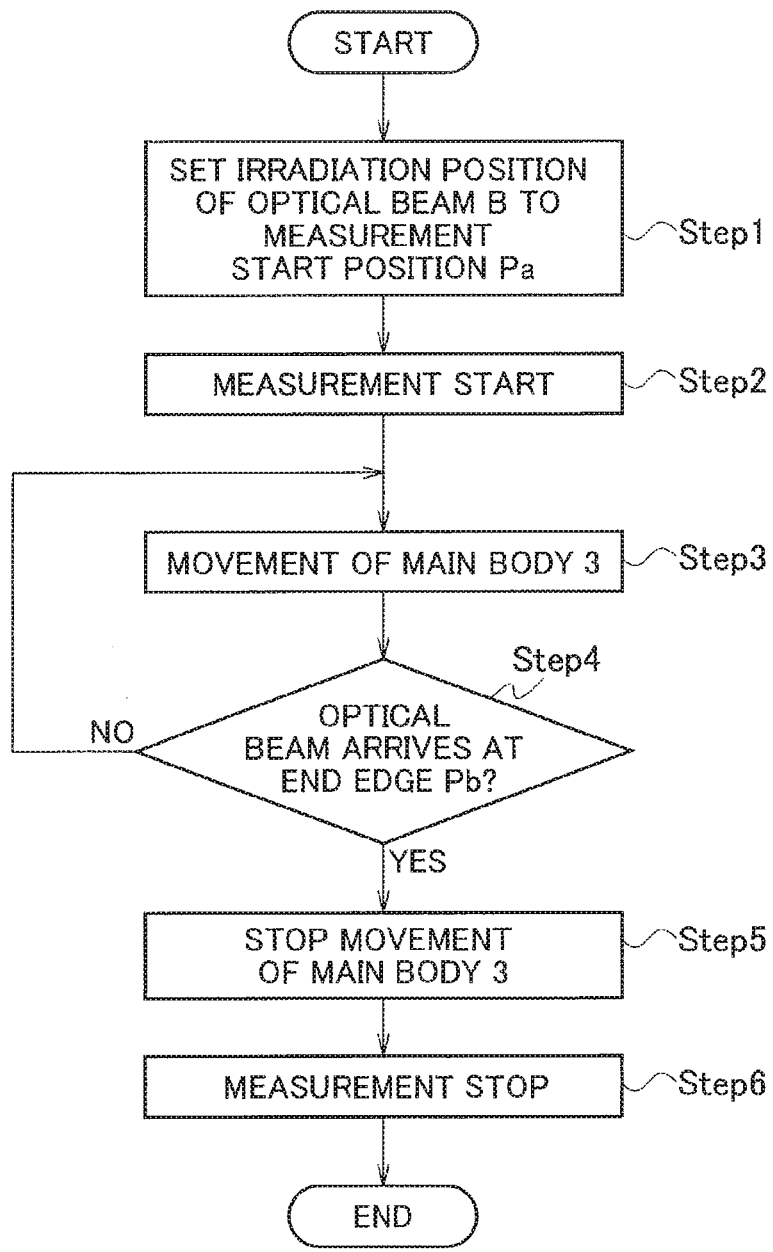
FIG. 4 It is a flowchart of a measurement operation in a workpiece detection operation.

The measurement operation will be explained with reference to FIG. 4 and FIG. 5. The controller 11 operates the drive portion KD to control a posture of the arm portion A so that the optical beam B is irradiated so as to intersect perpendicularly with the upper face 32a of the bottom plate and irradiated onto a measurement start point Pa (see FIG. 3) (Step 1). The measurement start point Pa is a point distanced from the reference point P1 toward a front side by a distance La along the upper face 32a.

The controller 11 starts recording of an output signal (e.g. an electric current value) from the distance sensor 7a (measurement start: Step 2), and moves the main body 3 (moves it straight) in the right direction on the guide rails 2a and 2b (Step 3). Due to this rightward movement of the main body 3, an irradiation position of the optical beam B moves on the irradiation path BK parallel-to and near the front face 34a of the rear wall plate 34 (see FIG. 3).

The controller 11 judges whether or not the irradiation position of the optical beam B arrives at an right end Pb of the bottom plate 32 (Step S4). The displacement (position) of the optical beam B is known from the displacement (position) of the main body 3.

If the judgement of the Step 4 is negative (No), a control flow returns to the Step 3 and the movement of the main body 3 is continued. On the other hand, if the judgement of the Step 4 is positive (Yes), the movement of the main body 3 is stopped (Step 5) and the record of the output signal is also stopped to finish the measurement (Step 6). Namely, the measurement operation is finished.

Figure 5:
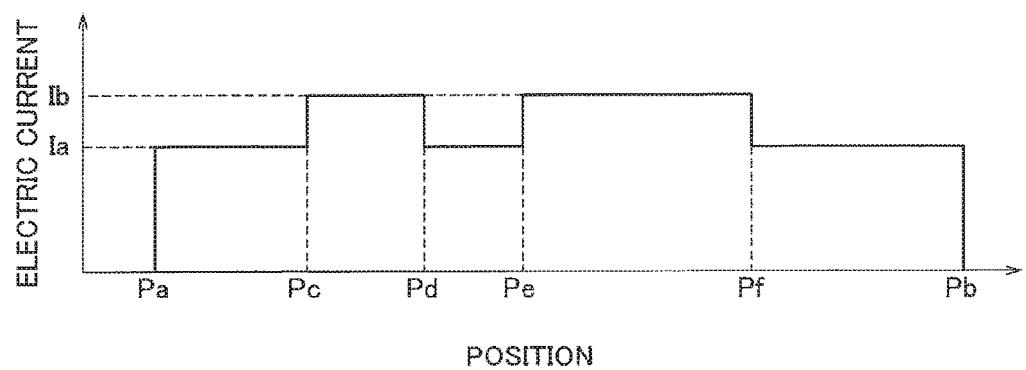
FIG. 5 It is a graph showing an example of changes of an electric current got through the measurement operation.

For example, in a case where a workpiece(s) has a shape shown in FIG. 3, data shown in FIG. 5 can be obtained by the workpiece detection operation (an output electric current value of the distance sensor 7a). The workpiece(s) shown in FIG. 3 has two protruded portions Wa and Wb that contact with the front face 34a of the rear wall plate 34.

As shown in FIG. 3, a distance between the distance sensor 7a and a distance-measured object on the irradiation path BK becomes shorter in a segment Pc-Pd where the optical beam B is irradiated onto the protruded portion Wa and a segment Pe-Pf where the optical beam B is irradiated onto the protruded portion Wb than other segments (where the optical beam B is irradiated onto the upper face 32a). Namely, as shown in FIG. 5, the output electric current of the distance sensor 7a in the segment Pc-Pd and the segment Pe-Pf indicates a higher electric current value Ib corresponding to a shorter distance by the height Ha of stacked workpieces W than an electric current value Ia corresponding to a reference distance when the optical beam B is irradiated onto the upper face 32a.

Relationship between a thickness Wt of one workpiece W and an output electric current value of the distance sensor 7a that corresponds to the thickness Wt is preliminarily stored in the memory storage 11R as a table. Therefore, the controller 11 can judge whether or not a workpiece(s) W is places on the stacker 31 by determining whether or not two electric current values are detected. In addition, the number of stacked workpieces W can be known from a difference of the two electric current values when the two electric current values are detected. In the present embodiment, an electric current value corresponding to a thickness Wt of one workpiece W is Ic.

<Judgement Operation>

Figure 6:
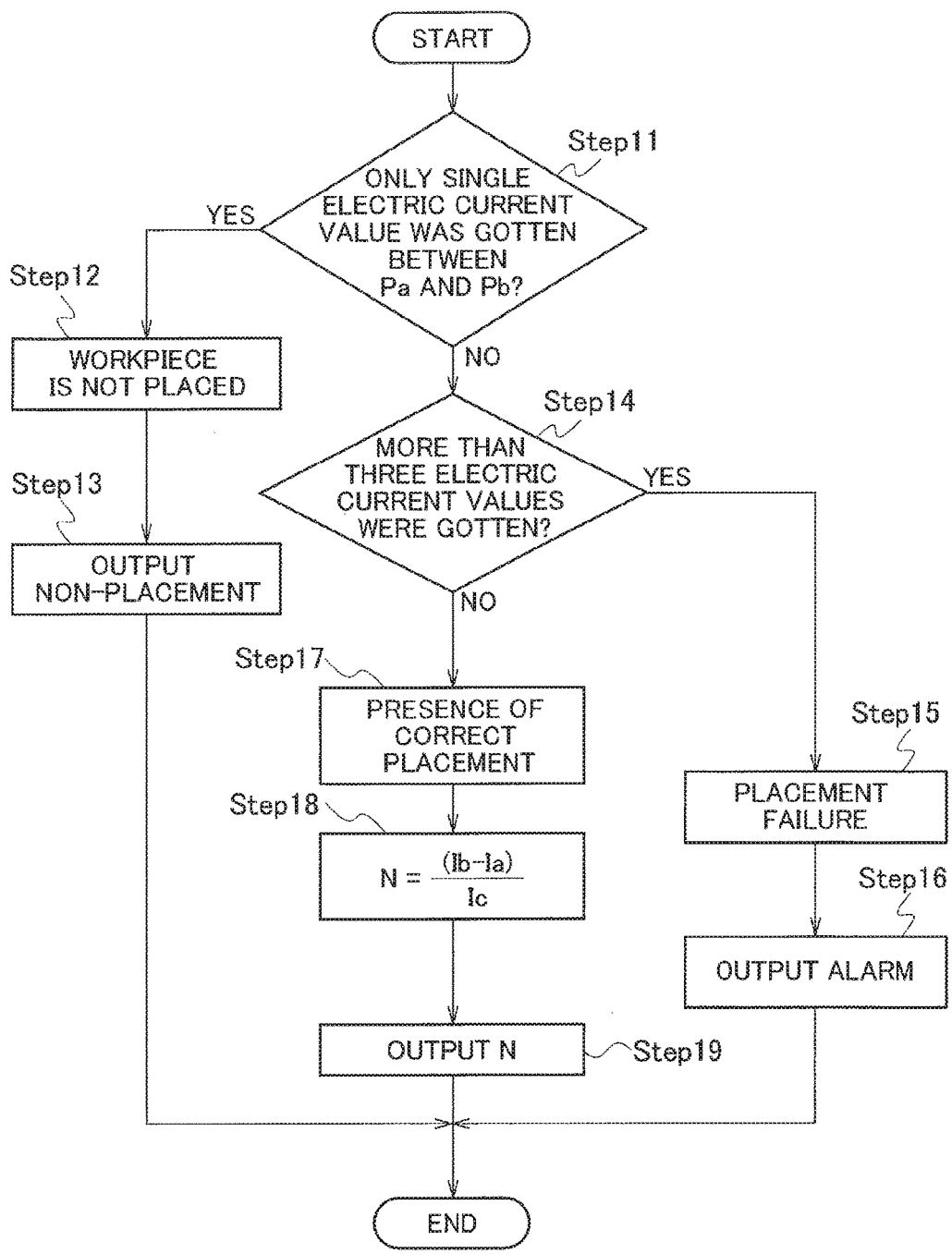
FIG. 6 It is a flowchart of a judgement operation in the workpiece detection operation.

Next, the judgement will be explained with reference to FIG. 6. The controller 11 judges, based on the measurement result got from the measurement operation, whether or not only one electric current value is measured between the measurement start point Pa and the end Pb (Step 11). If the judgement of the Step 11 is positive (Yes), it is judged that no workpiece W is placed (Step 12) and then a signal indicating "non-placement" is output (Step 13) to finish the judgement operation.

On the other hand, if the judgement of the Step 11 is negative (No), it is judged whether or not three or more electric current values are measured (Step 14). Since a workpiece(s) W is a flat plate material in the present embodiment, three or more electric current values could not be measured as long as workpieces W are stacked correctly. Therefore, if the judgement of the Step 14 is positive (Yes), it is judged as a placement failure (Step 15) and an alarm is output (Step 16) to finish the judgement operation. On the other hand, if the judgement of the Step 14 is negative (No) (i.e. in a case where two electric current values are measured), it is judged that workpieces W are correctly placed (Step 17).

Subsequently to the Step 17, the number N of the stacked workpieces W is calculated by dividing the difference (Ib−Ia) of the two electric current values by the electric current value Ic corresponding to the thickness Wt of one workpiece W (Step 18). The calculated number N is output (Step 19), and then the judgement operation is finished. In these manners, the workpiece detection operation (the measurement operation and the judgement operation) is completed.

If it is judged in the Step 17 that workpieces W are correctly placed, the controller 11 takes out, for the bending machine M, a workpiece W placed on the stacker 31 by controlling the arm portion A. Here, since the controller 11 keeps the stack height Ha, the controller 11 moves the end arm 10 at high speed to an upper position distanced from an uppermost workpiece W by a predetermined distance (e.g. 15 mm) and then moves the end arm 10 at low speed.

It is preferable to set the distance La between the reference point P1 and the measurement start point Pa to a value as small as possible (e.g. a value equivalent to the thickness Wt). In the workpiece detection operation, it is not necessary to store information on a shape of a workpiece W and so on in the memory storage 11R. Therefore, the controller 11 never be interrupted by referring to the information on a shape of a workpiece W, and thereby processes can be carried out at a higher speed for that. However, in a case where the information on a shape of a workpiece W is stored in the memory storage 11R for a different purpose, the controller 11 may retrieve a cut-in distance (corresponding to a distance Lb in FIG. 3) of a cutout having a smallest distance from the outline based on the information of the shape and then may set the distance La to a value smaller than the cut-in distance Lb.

According to the above-explained bending robot 1, the distance sensor 7a for judging whether or not a workpiece(s) W is placed on the stacker 31 is provided in the arm portion A, and it is possible to measure a distance to a distance-measured object (workpiece W) on a lower side from the arm portion A. Therefore, the arm portion A never interferes with the measurement area of the distance sensor 7a while measuring a distance to the stacker 31 on the lower side from the arm portion A, so that the judgment of workpiece existence or non-existence (judgement whether or not a workpiece W is stored on the stacker 31) can be done in a short time. As a result, bending can be done with high efficiency.

The present invention is not limited to the above embodiment (processes and configurations), and can be modified within a scope that doesn't deviate from the subject matter of the present invention.

Figure 7:
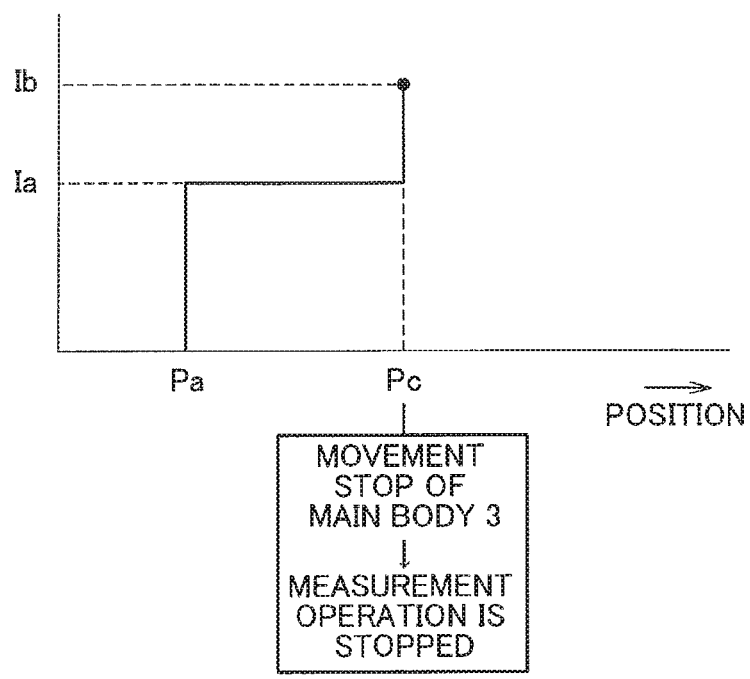
FIG. 7 It is a graph of a modified example of the judgement operation.

For example, the measurement operation and the judgement operation may be done concurrently. Specifically, it may be judged that a workpiece(s) is placed (the judgement operation) at a time when two electric current values are detected as shown in FIG. 7 during the measurement operation. In this case, the workpiece detection operation (the measurement operation and the judgement operation) may be completed by stopping the measurement operation even though the optical beam B doesn't yet arrived at the end Pb. In addition, it is not always true that these two electric current values are detected in an order as shown in FIG. 7 i.e. the low electric current value Ia corresponding to the upper face 32a of the bottom plate 32 and then the high electric current value Ib corresponding to the height Ha of workpieces W. There may be no cutout at the reference point P1 with a certain shape of a workpiece W, so that and the high electric current value Ib is measured at the measuring start and then the low electric current value Ia is measures while the optical beam B is irradiated onto the upper face 32a through a cutout or the optical beam B is irradiated onto the upper face 32a after passing over an end of the workpiece W. Also in this case, the two electric current values are detected, so that it may be judged that a workpiece(s) W is placed on the stacker 31 and then the workpiece detection operation may be completed. According to this, the workpiece detection operation can be carried out at higher speed.

In the present embodiment, the above-explained electric current value Ia is set in the measurement operation by serving the upper face 32a of the bottom plate 32 as the distance measurement reference plane. However, another plane may be set as the distance measurement reference plane. For example, a stacker 31A shown in FIG. 8 may be used instead of the above-explained stacker 31. In the stacker 31A, a (distance measurement) reference plane 31Aa whose height from the upper face 32a is set with high accuracy is provided on an upper end face of the left wall plate 33. In the measurement operation, the optical beam B is irradiated along an irradiation path BKa of which start position is a point PaA on the reference plane 31Aa.

When no workpiece W is placed on the stacker 31A, two electric current values corresponding to distances to the reference plane 31Aa and the upper face 32a are measured. On the other hand, when a workpiece(s) W is placed on the stacker 31A and the upper face 32a is not included on the irradiation path BK, two electric current values corresponding to distances to the reference plane 31Aa and an upper face We of the workpiece(s) W are measured. Since an electric current value corresponding to the upper face We is different from the electric current value corresponding to the upper face 32a, it is detected that the workpiece(s) W is placed on the stacker 31A. In addition, when a workpiece(s) W is placed on the stacker 31A and the upper face 32a is not included on the irradiation path BK according to a shape (cutout) of the workpiece(s) W, three electric current values corresponding to distances to the reference plane 31Aa, the upper face We of the workpiece(s) W and the upper face 32a are measured. In this case, it is detected that the workpiece(s) W is placed on the stacker 31A without the need to compare the electric current values with each other.

Figure 8:
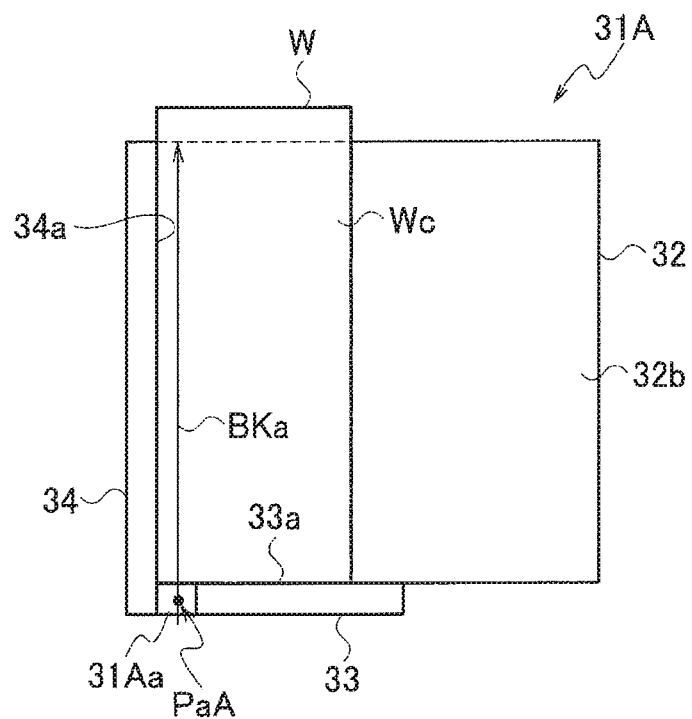
FIG. 8 It is a plan view of a modified example of the workpiece detection operation.

According to the method with providing the reference plane 31Aa, placement or non-placement of a workpiece(s) W can be judged even when a workpiece W has a large rectangular shape having no cutout and spreading out from the bottom plate 32 as shown in FIG. 8.

In the above-explained judgement operation, magnitudes of the electric current values output from the distance sensor 7a are relatively compared with each other. However, the judgement may be done based on an absolute value(s) of the electric current value(s) output from the distance sensor 7a. In this case, a distance(s) to a distance-measurement object and an absolute value(s) of an electric current value(s) are preliminarily corresponded to each other during a calibration of the distance sensor 7a. These correspondences are stored as a correspondence table in the memory storage 11R. In addition, an effective measuring range of the distance sensor 7a is set as a distance Da to Db along a direction of the optical beam B irradiated from the distance sensor 7a. This range is set slightly narrower than a measurement range of specification of the distance sensor 7a. For example, when a measurement range of specification of the distance sensor 7a is 250 mm to 750 mm, the effective measuring range is set as Da=300 mm to Db=700 mm for some reasons such as accuracy maintenance and so on. Under these preconditions, the measurement is carried out by irradiating the optical beam B along the irradiation path BK shown in FIG. 3, for example.

Figure 9:
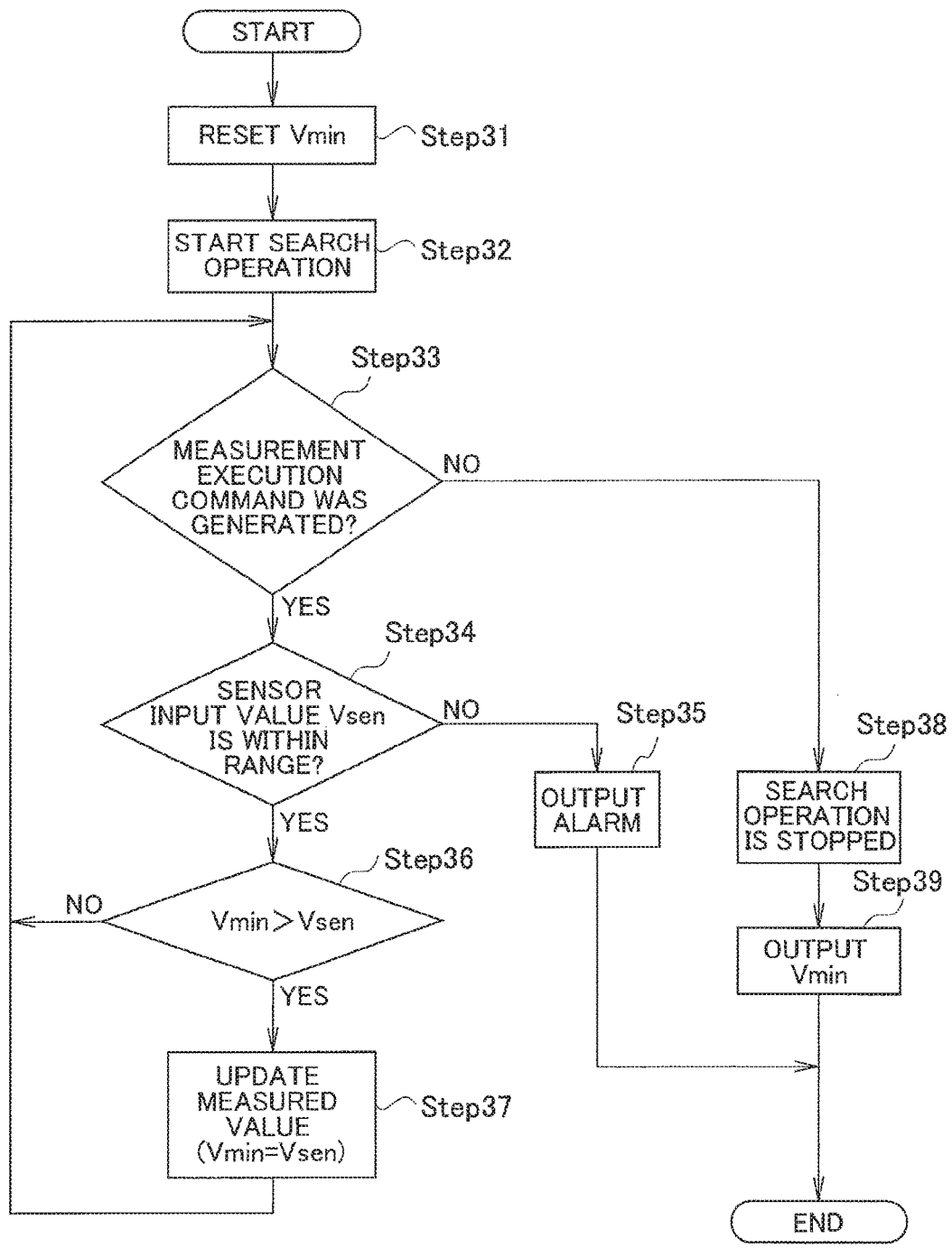
FIG. 9 It is a flowchart of another judgement operation.

FIG. 9 shows a flowchart of the judgement operation based on an absolute value. A Vsen is a distance to a distance-measurement object retrieved from the correspondence table stored in the memory storage 11R based on an absolute value of an output electric current of the distance sensor 7a. A Vmin is a distance closest to the distance sensor 7a in the distance Vsen on the irradiation path BK after the measurement is started (i.e. a minimum value of the measured distance Vsen is Vmin). First, the Vmin is reset (Step 31) for a new measurement, and then a measurement search operation is started (Step 32). For example, the Vmin is reset to its maximum value (farthest distance: 700 mm) in the Step 31.

Subsequently, it is confirmed whether or not a measurement execution command is generated (Step 33). If no measurement execution command is generated (No), the search operation is finished (Step 38), and the Vmin at the time point is output (Step 39) to finish the measurement operation. On the other hand, if a measurement execution command is generated (Yes), it is judged whether or not the measured Vsen stays within the effective measuring range, i.e. whether or not Da<Vsen<Db is satisfied (Step 34).

If the Step 34 is negative (No), it is assumed that measurement is hard to be carried out due to setting failure, placement failure of a workpiece(s) or the like. Therefore, an alarm is output (Step 35) and then the measurement operation is finished. If the Step 34 is positive (Yes), the measurement is maintained, and it is judged whether or not a value of the Vsen is smaller than the Vmin (Step 36).

If the Step 36 is negative (No), the control flow returns to the Step 33. On the other hand, if the Step 36 is positive (Yes), the Vmin is overwritten by the measured Vsen to update the measured value (Step 37). After the Step 37, the control flow returns to the Step 33.

According to the present modified example, a distance to the distance-measurement object from the distance sensor 7a can be measured based on the absolute value of the output electric current of the distance sensor 7a. Therefore, an uneven state on the irradiation path BK is recognized and placement or non-placement of a workpiece(s) W can be judged. In addition, since an absolute value of an output electric current corresponding to one workpiece W can be known preliminarily, the number of stacked workpieces W can be also judged.

Note that the mount location of the controller 11 is not limited. The controller 11 may be integrated within the bending robot 1. In addition, the controller 11 may communicate with the bending robot 1 wirelessly by providing a wireless communication means in the bending robot 1.

The first aspect of the present invention may be also defined as below.

1. A bending robot that takes out a workpiece that is stored on a stacker and whose end face is being contacted with a storage reference flat plane of the stacker, and then supplies the workpiece to a bending machine, comprising:

a main body that is movable parallel to the storage reference flat plane;

an arm portion that is supported by the main body and capable of positioning above the stacker; and a distance sensor that is provided in the arm portion and measures a distance to the workpiece stored on the stacker in a contactless manner.

2. The bending robot according to the above 1, wherein the distance sensor measures the distance to the workpiece along a measurement path in a vicinity of the storage reference flat plane while the main body moves parallel to the storage reference flat plane.

3. The bending robot according to the above 1 or 2, further comprising:

a controller that includes a memory storage that preliminarily stores a distance between the distance sensor and an upper face of a bottom plate of the stacker, wherein the controller judges whether or not the workpiece is stored on the stacker based on a comparison of the distance to the workpiece measured by the distance sensor with a distance to the upper face preliminarily stored in the memory storage.

The second aspect of the present invention may be also defined as below.

A. A method for detecting whether or not a workpiece to be supplied to a bending machine by a bending robot is stored on a stacker, wherein the stacker includes a wall plate that has a storage reference flat plane contacting with an end face of the workpiece stored; and the bending robot includes a main body that is movable parallel to the storage reference flat plane, an arm portion that is supported by the main body and capable of positioning above the stacker, and a distance sensor that is provided in the arm portion and measures a distance to the workpiece stored on the stacker in a contactless manner, the method comprising:

moving the main body parallel to the storage reference flat plane;

measuring a distance along a measurement path in a vicinity of the storage reference flat plane by the distance sensor while the main body moves parallel to the storage reference flat plane; and judging that the workpiece is stored on the stacker when two types of distances are measured by the distance sensor.

The entire contents of a Japanese Patent Application No. 2015-30214 (filed Feb. 19, 2015) are incorporated herein by reference. Although the invention has been described above by reference to a certain embodiment of the invention, the invention is not limited to the embodiment described above. Scope of the present invention is determined in the context of the claims.

The invention claimed is:

1. A bending robot configured to remove a workpiece stored on a stacker and then to supply the workpiece to a bending machine, the workpiece being stacked on a bottom plate of the stacker, the stacker further including a wall plate having a storage reference flat plane extending upwardly from the bottom plate and configured to contact an end face of the workpiece, the bending robot comprising:

a main body movable parallel to the storage reference flat plane;

an arm portion supported by the main body and configured to be positioned above the stacker; and a distance sensor provided in the arm portion and configured to measure a distance to the workpiece stored on the stacker in a contactless manner, wherein the main body moves parallel to the storage reference flat plane; and the distance sensor measures on a measurement path in a vicinity of the storage reference flat plane.

2. A method for detecting whether or not a workpiece is stored on a stacker that stores the workpiece to be supplied to a bending machine by a bending robot, the method comprising:

providing, in the stacker, a bottom plate on which the workpiece is to be stacked and a wall plate having a storage reference flat plane that is raised from the bottom plate and with which an end face of the workpiece is to be contacted;

preliminarily providing, in the bending robot, a main body that is movable parallel to the storage reference flat plane, an arm portion that is supported by the main body and capable of positioning above the stacker, and a distance sensor that is provided in the arm portion and capable of measuring a distance to the workpiece stored on the stacker in a contactless manner;

moving the main body parallel to the storage reference flat plane and measuring a distance along a measurement path in a vicinity of the storage reference flat plane by the distance sensor; and judging that the workpiece is stored on the stacker when two electric current values or electric voltage values are measured in the distance-measurement of the measuring.

3. A workpiece supply apparatus comprising:

a stacker for storing a workpiece, the stacker comprising:
 a bottom plate configured to stack the workpiece; and
 a wall plate having a storage reference plane extending upwardly from the bottom plate and configured to contact an end face of the workpiece;

a bending robot configured to remove the workpiece stored on the stacker and then to supply the workpiece to a bending machine, the bending robot comprising:
 a main body movable parallel to the storage reference flat plane;
 an arm portion supported by the main body and configured to be positioned above the stacker; and
 a distance sensor provided in the arm portion and configured to measure a distance to the workpiece stored on the stacker in a contactless manner, wherein the main body moves parallel to the storage reference flat plane; and the distance sensor measures on a measurement path in a vicinity of the storage reference flat plane.

* * * * *